(12) United States Patent
Shimauchi et al.

(10) Patent No.: US 11,542,881 B2
(45) Date of Patent: Jan. 3, 2023

(54) CONTROL DEVICE OF VEHICLE

(71) Applicant: TOYOTA JIDOSHA KABUSHIKI KAISHA, Toyota (JP)

(72) Inventors: Takayuki Shimauchi, Toyota (JP); Hidekazu Hirabayashi, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/705,577

(22) Filed: Mar. 28, 2022

(65) Prior Publication Data

US 2022/0364523 A1    Nov. 17, 2022

(30) Foreign Application Priority Data

May 14, 2021  (JP) .............................. JP2021-082046

(51) Int. Cl.

| *G06F 1/00* | (2006.01) |
|---|---|
| *F02D 41/06* | (2006.01) |
| *B60H 1/04* | (2006.01) |
| *B60H 1/00* | (2006.01) |

(52) U.S. Cl.
CPC ....... *F02D 41/068* (2013.01); *B60H 1/00821* (2013.01); *B60H 1/00878* (2013.01); *B60H 1/04* (2013.01); *F02D 2200/02* (2013.01)

(58) Field of Classification Search
CPC .... F02D 13/0219; F02D 9/02; F02D 41/0077; F02D 41/0007; F02D 2200/1002; B60H 1/02; B60H 1/00764
See application file for complete search history.

(56) References Cited

U.S. PATENT DOCUMENTS

| 9,932,909 | B1 * | 4/2018 | Levijoki ............ B60H 1/00764 |
|---|---|---|---|
| 2010/0145562 | A1 * | 6/2010 | Moran .................. B60W 20/13 |
| | | | 180/65.28 |
| 2018/0156097 | A1 | 6/2018 | Suzuki et al. |
| 2018/0244266 | A1 * | 8/2018 | Habu ..................... B60K 6/445 |
| 2018/0340481 | A1 * | 11/2018 | Miwa ........................ F01N 9/00 |
| 2020/0215874 | A1 | 7/2020 | Shibamoto et al. |
| 2020/0362808 | A1 * | 11/2020 | Cosgrove ............... B60H 1/322 |

FOREIGN PATENT DOCUMENTS

| JP | 2018-090154 A | 6/2018 |
|---|---|---|
| JP | 2020-112037 A | 7/2020 |

* cited by examiner

*Primary Examiner* — John Kwon
(74) *Attorney, Agent, or Firm* — Dinsmore & Shohl LLP (57) ABSTRACT

A control device is installed in the vehicle that is able to execute a fuel cut that stops fuel supply to an engine in a state in which the engine is rotating. In a case where there is a request for the fuel cut while there is a heating request in which heating of a vehicle cabin is performed using heat of an engine coolant, when a blowout port mode of air conditioning air is set to a defroster mode or a bi-level mode, the control device prohibits the fuel cut.

2 Claims, 6 Drawing Sheets

CONTROL DEVICE OF VEHICLE

CROSS-REFERENCE TO RELATED APPLICATION

This application claims priority to Japanese Patent Application No. 2021-082046 filed on May 14, 2021, incorporated herein by reference in its entirety.

BACKGROUND

1. Technical Field

The present disclosure relates to a control device installed in a vehicle that is able to execute a fuel cut that stops fuel supply to an engine (internal combustion engine).

2. Description of Related Art

Japanese Unexamined Patent Application Publication No. 2018-090154 (JP 2018-090154 A) discloses a technique of not executing a heating control and executing a regeneration cut control when the heating control is requested and the regeneration cut control is requested in a control device that performs the regeneration cut control and the heating control. Here, in the regeneration cut control, a fuel cut that stops fuel supply to an engine (internal combustion engine) is performed to perform regeneration of a filter. In the heating control, the engine is set to a combustion state and heating is performed by a heat core.

However, in the technique disclosed in JP 2018-090154 A described above, since the regeneration cut control of performing the fuel cut is prioritized, when the regeneration cut control is being performed, an engine coolant temperature that is a temperature of an engine coolant is decreased, and a blowout temperature of air conditioning air is decreased. Thus, there is room for improvement regarding the technique described above in order to not decrease the comfortability of the passenger (user).

SUMMARY

An object of the present disclosure is to provide a control device of a vehicle in which the control device is able to suppress a decrease in passenger comfortability resulting from a fuel cut.

The present disclosure that achieves the above object is as follows.

(1) A control device of a vehicle in which the control device is installed in the vehicle that is able to execute a fuel cut that stops fuel supply to an engine in a state in which the engine is rotating, in which when there is a request for the fuel cut while there is a heating request in which heating of a vehicle cabin is performed using heat of an engine coolant, when a blowout port mode of air conditioning air is set to a defroster mode or a bi-level mode, the control device prohibits the fuel cut.

(2) The control device of the vehicle according to (1) in which when an engine coolant temperature that is a coolant temperature of the engine coolant is less than a target coolant temperature with respect to a target blowout temperature to the vehicle cabin, the fuel cut is prohibited.

Regarding (1) Described Above:
The blowout port mode of air conditioning air includes a defroster (DEF) mode that performs blowout toward a windshield, a face (FACE) mode that performs blowout toward an upper body of a passenger (user), a foot (FOOT) mode that performs blowout toward feet of the passenger, a bi-level (BI-LEVEL) mode that performs blowout toward the upper body and the feet of the passenger, and the like. Among the above, when the defroster mode is selected, it is necessary to remove windshield fogging in response to a request from the passenger and ensure visibility of the passenger. In addition, when the bi-level mode is selected, it is necessary to ensure a state in which the passenger's head is cool and feet are warm in which the passenger feels comfortable in response to a request from the passenger. Thus, the defroster mode and the bi-level mode are modes with a relatively high priority within the blowout port modes of the air conditioning air.

On this basis, according to the control device described above in (1), even when there is a request for the fuel cut while heating being requested, when the blowout port mode of air conditioning air is set to a defroster mode or a bi-level mode, since the control device prohibits the fuel cut, it is possible to prohibit the fuel cut and prioritize heating. Thus, it is possible to suppress the engine coolant temperature from decreasing due to the executing the fuel cut and suppress the blowout temperature of the air conditioning air from decreasing, and it is possible to efficiently acquire the effect of the defroster mode and the bi-level mode. Therefore, it is possible to suppress a decrease in passenger comfortability resulting from a fuel cut.

Regarding (2) described above:
When the engine coolant temperature is equal to or higher than the target coolant temperature with respect to the target blowout temperature (TAO) to the vehicle cabin, even when the fuel cut is executed and the engine coolant temperature is slightly decreased, the blowout temperature of the air conditioning air is not decreased to a degree in which the comfortability of the passenger is affected, and it is possible to efficiently acquire the effect of the defroster mode and the bi-level mode. Thus, the fuel cut can be executed. In contrast, when the engine coolant temperature is less than the target coolant temperature with respect to the target blowout temperature (TAO) to the vehicle cabin, when the fuel cut is executed and the engine coolant temperature is decreased, there is a possibility that it is difficult to efficiently acquire the effect of the defroster mode and the bi-level mode.

On this basis, according to the control device described in (2), since the fuel cut is prohibited when the engine coolant temperature is less than the target coolant temperature with respect to the target blowout temperature (TAO) to the vehicle cabin (since the control described in (1) is performed), it is possible to execute the fuel cut without prohibiting the fuel cut when the engine coolant temperature is equal to or higher than the target coolant temperature with respect to the target blowout temperature (TAO). Thus, it is possible to suppress a decrease in opportunities to perform the fuel cut while suppressing a decrease in passenger comfortability resulting from the fuel cut.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a control device 10 of the vehicle according to an example of the present disclosure will be described with reference to the drawings.

A vehicle V in which the control device 10 of the example of the present disclosure is installed is a vehicle that is able to execute a fuel cut that stops fuel supply to an engine (may be called an internal combustion engine) 20 in a state in which the engine 20 is rotating. The vehicle V may be a conventional vehicle in which only the engine 20 serves as a traveling drive source and in which a traveling motor is not provided, may be a plug-in hybrid vehicle (PHV), or may be a hybrid vehicle (HV). The conventional vehicle may use gasoline as fuel or may use diesel fuel as fuel.

Figure 1:
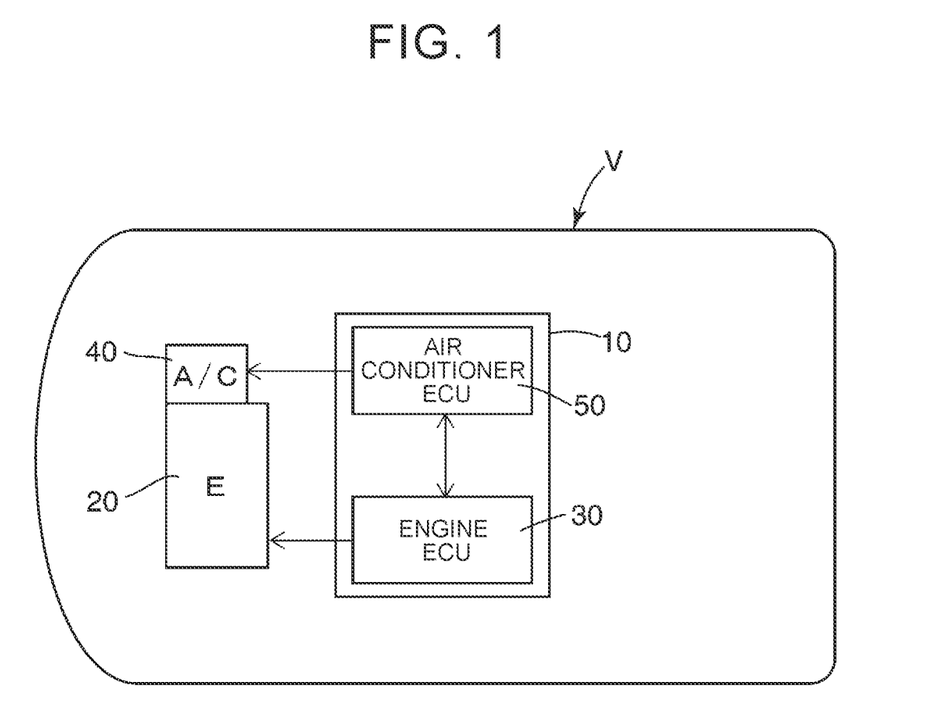
FIG. 1 is a schematic configuration diagram of a vehicle in which a control device of an example of the present disclosure is installed.

As illustrated in FIG. 1, the control device 10 has an engine electronic control unit (ECU) 30 that controls the operation of the engine 20, and an air conditioning ECU 50 that controls the operation of an air conditioning device 40.

The engine ECU 30 controls the driving state of the engine 20, and controls the fuel injection amount from an injector (not shown), and the like. By stopping fuel injection from the injector (not shown) when a predetermined fuel cut condition is satisfied, the engine ECU 30 is able to stop fuel supply to the engine 20 (able to perform a fuel cut). A plurality of the predetermined fuel cut conditions is set, corresponding to the following: (i) for improving fuel efficiency; (ii) for improving driveability; (iii) for regenerating a particulate filter (GPF) that collect particulate matter in exhaust gas; (iv) for motoring in which the engine 20 is rotated by an external force by a motor (not shown) when a battery (not shown) is fully charged in cases of a PHV or an HV; and the like.

Figure 2:
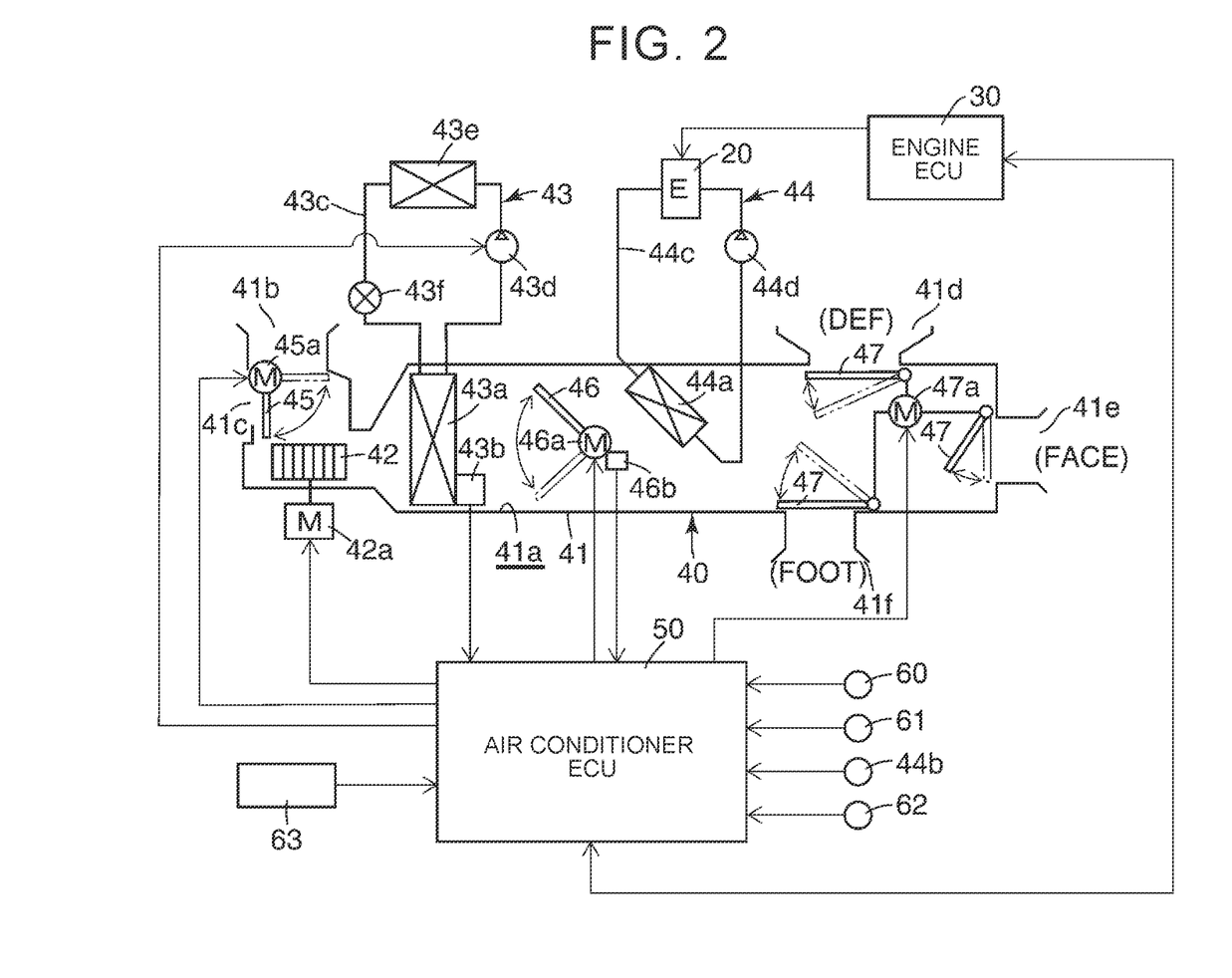
FIG. 2 is a schematic configuration diagram of the control device of an example of the present disclosure, and an air conditioning device and an engine that are controlled by the control device.

The air conditioning device 40 is provided to perform air conditioning of a vehicle cabin. The air conditioning device 40 is provided inside an instrumental panel of the vehicle. As shown in FIG. 2, the air conditioning device 40 includes an air conditioning duct 41, a blower 42, a cooling device 43, a heating device 44, an inside-outside air switching damper 45, an air mix damper 46, and a blowout port switching damper 47.

The air conditioning duct 41 includes therein, a ventilation path 41a through which air conditioning air for air conditioning the vehicle cabin. The air conditioning duct 41 includes an outside air suction port 41b that takes in the air outside the vehicle from the outside of the air conditioning duct 41 into the ventilation path 41a, and an inside air suction port 41c that takes in air of the vehicle cabin. The air conditioning duct 41 also includes a plurality of blowout ports 41d, 41e, 41f that blowouts the air of the ventilation path 41a.

The outside air suction port 41b and the inside air suction port 41c can be open and closed by the inside-outside air switching damper 45. The inside-outside air switching damper 45 is driven by an inside-outside air switching damper motor 45a. When the inside-outside air switching damper 45 closes the inside air suction port 41c, the outside air suction port 41b is opened and air is taken into the ventilation path 41a from the outside air suction port 41b. When the inside-outside air switching damper 45 closes the outside air suction port 41b, the inside air suction port 41c is opened and air is taken into the ventilation path 41a from the inside air suction port 41c.

The blowout port 41d is a defroster (DEF) blowout port that blows out air toward a windshield (may be called a front window shield). The blowout port 41e is a face blowout port that blows out air toward an upper body of the passenger including a head portion. The blowout port 41f is a foot blowout port that blows out air toward feet of the passenger.

The blowout port switching damper 47 is provided on each of the blowout ports 41d, 41e, 41f. Each of the blowout port switching dampers 47 is driven by a blowout port switching damper motor 47a. With the blowout port switching dampers 47, a blowout mode of air conditioning air blown out toward the vehicle cabin can be changed to any one of a defroster (DEF) mode, a face (FACE) mode, a bi-level (BI-LEVEL) mode, a foot (FOOT) mode, and a foot defroster (FOOT-DEF) mode.

The blower 42 is disposed on a downstream side of the inside-outside air switching damper 45 in an airflow direction, within the air conditioning duct 41. The blower 42 is operated by driving a blower motor 42a, and generates an air flow of the ventilation path 41a. With an operation amount of the blower 42, it is possible to adjust an air amount (wind amount) that flows in the ventilation path 41a. Thus, with the operation amount of the blower 42, it is possible to adjust the wind amount of the air conditioning air that is blown out from the blowout ports 41d, 41e, 41f toward the vehicle cabin.

The cooling device 43 includes an evaporator 43a. The evaporator 43a is disposed on the downstream side of the blower 42 in the airflow direction, within the air conditioning duct 41. The evaporator 43a cools and dehumidifies air flowing through the ventilation path 41a by exchanging heat between a coolant flowing through therein and air flowing through the ventilation path 41a. Evaporator sensors 43b are provided inside and/or outside the evaporator 43a, and can detect the temperature of the evaporator 43a.

The cooling device 43 includes a freezing cycle 43c in which the coolant circulates. The freezing cycle 43c includes a compressor 43d that compresses the coolant, a condenser 43e, and an expanding valve 43f, in addition to the evaporator 43a.

The compressor 43d is able to make the coolant circulate in the freezing cycle 43c by compressing and discharging the coolant that flows in from the evaporator 43a. The condenser 43e is disposed on the downstream side of the compressor 43d. The condenser 43e exchanges heat between the coolant that became a coolant with a high temperature and a high pressure in the compressor 43d and air outside the vehicle (outside air). The expanding valve 43f is disposed on the downstream side of the condenser 43e and on an upstream side of the evaporator 43a.

The heating device 44 includes a heater core 44a. The heater core 44a is disposed on the downstream side of the evaporator 43a in the airflow direction, within the air conditioning duct 41. An engine coolant that circulates between the engine 20 and the heater core 44a flows inside the heater core 44a. The heater core 44a heats air flowing through the ventilation path 41a by exchanging heat between the engine coolant heated by the engine 20 and air flowing through the ventilation path 41a.

The heating device 44 includes a coolant circuit 44c in which the engine coolant circulates. The coolant circuit 44c includes a water pump 44d in addition to the heater core 44a. The engine coolant is circulated between the engine 20 and the heater core 44a by the water pump 44d.

The engine coolant is heated by the engine 20 in the combustion state. Thus, when the engine 20 is in the combustion state, the engine coolant temperature that is the coolant temperature of the engine coolant is increased. However, when the fuel cut is executed and the engine 20 is not in the combustion state, the engine coolant temperature is decreased. A coolant temperature sensor 44b is provided in the coolant circuit 44c, and is able to detect the engine coolant temperature.

The air mix damper 46 is disposed on the downstream side of the evaporator 43a in the airflow direction and on the upstream side of the heater core 44a in the airflow direction, within the air conditioning duct 41. The air mix damper 46 is operated driving an air mix damper motor 46a. The air mix damper 46 adjusts the amount of air to be passed through the heater core 44a and the amount of air to bypass the heater core 44a, among air that passes through the evaporator 43a. The position of the air mix damper 46 can be detected by a potentiometer 46b.

The air conditioning ECU 50 controls the air conditioning device 40 in accordance with an air conditioning request from the passenger. The air conditioning ECU 50 is connected to the engine ECU 30 such that the air conditioning ECU 50 and the engine ECU 30 can communicate with each other.

The inside-outside air switching damper motor 45a, the blowout port switching damper motor 47a, the blower motor 42a, the evaporator sensor 43b, the compressor 43d, the coolant temperature sensor 44b, the potentiometer 46b, an inside air sensor 60 that detects a vehicle cabin temperature, an outside air sensor 61 that detects an outer-vehicle temperature, and a solar radiation sensor 62 that detects a solar radiation amount are connected to the air conditioning ECU 50. Further, an operation unit 63 for the passenger to perform operations of turning on/off the air conditioning device 40, turning on/off automatic air conditioning, setting an air conditioning temperature, selecting the blowout port mode, and the like is connected to the air conditioning ECU 50.

When the air conditioning device 40 is turned on, the air conditioning ECU 50 calculates a target blowout temperature (TAO) that is a target temperature of the air conditioning air blown out from the blowout ports 41d, 41e, 41f of the air conditioning duct 41. The air conditioning ECU 50 calculates the TAO using the formula (1) below. TAO=Kset×Tset−Kr×Tr−Kam×Tam−Ks×Ts+C . . . (1)
Tset is a set temperature set by the passenger. Tr is the vehicle cabin temperature detected by the inside air sensor 60. Tam is an outside air temperature detected by the outside air sensor 61. Ts is the solar radiation amount detected by the solar radiation sensor 62. Kset, Kr, Kam, Ks are gains and C is a correction constant.

When the air conditioning device 40 is turned on, the air conditioning ECU 50 determines a target coolant temperature of the engine coolant with respect to the target blowout temperature (TAO).

When automatic air conditioning is turned on by the passenger, the air conditioning ECU 50 automatically performs control of the air mix damper motor 46a, on/off control of the compressor 43d, control of the blowout port switching damper motor 47a, and the like in accordance with the target blowout temperature (TAO). However, the control of the blowout port switching damper motor 47a, and the like can be executed manually by the passenger even when the automatic air conditioning is turned off.

Figure 3:
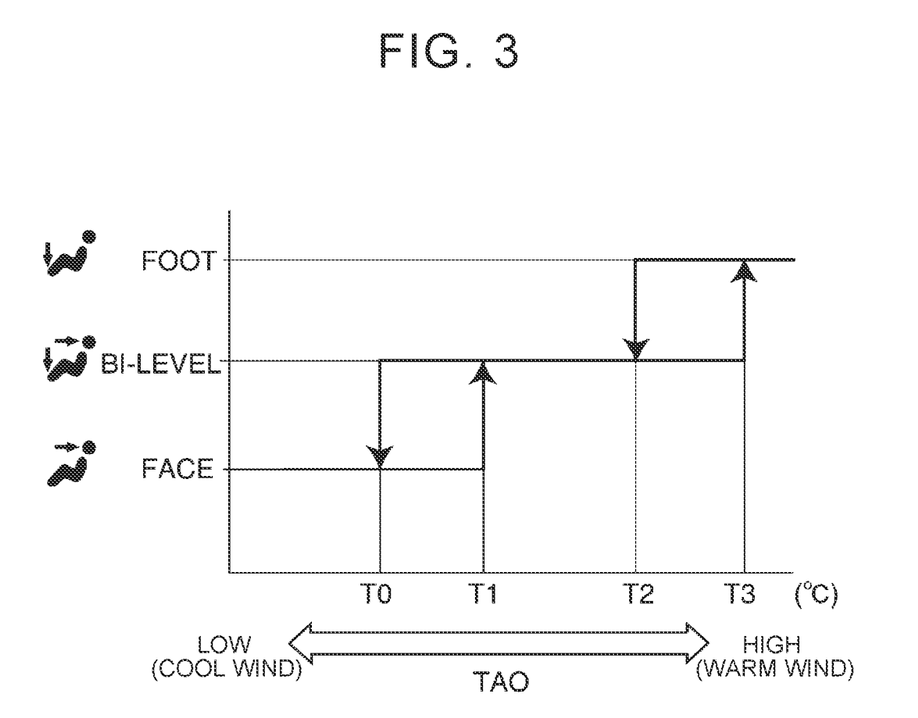
FIG. 3 is a diagram showing the relationship between a target blowout temperature and a blowout port mode of the air conditioning air during automatic air conditioning of an air conditioning ECU in the control device of the example of the present disclosure.

FIG. 3 shows the relationship between the target blowout temperature (TAO) and the blowout port mode acquired by drive control of the blowout port switching damper motor 47a, when automatic air conditioning is turned on.

When the target blowout temperature (TAO) is increasing, when TAO≤T0 is satisfied, the blowout port mode is the face (FACE) mode, and when the TAO increases and the TAO reaches T1 (>T0), the blowout port mode switches from the face (FACE) mode to the bi-level (BI-LEVEL) mode. When the TAO increases further and the TAO reaches T3 (>T1), the blowout port mode switches from the bi-level (BI-LEVEL) mode to the foot (FOOT) mode.

In contrast, when the target blowout temperature (TAO) is decreasing, when the TAO decreases from when TAO≥T3 is satisfied and the TAO reaches T2 (T1<T2<T3), the blowout port mode switches from the foot (FOOT) mode to the bi-level (BI-LEVEL) mode. When the TAO decreases further and the TAO reaches T0 (<T1), the blowout port mode switches from the bi-level (BI-LEVEL) mode to the face (FACE) mode.

Wen the TAO is increased and when the TAO is decreased, there is a difference of T1−T0 in the switching temperature between the face (FACE) mode and the bi-level (BI-LEVEL) mode, and there is a difference of T3-T2 in the switching temperature between the bi-level (BI-LEVEL) mode and the foot (FOOT) mode. These are hysteresis widths for suppressing control hunting.

Figure 4:
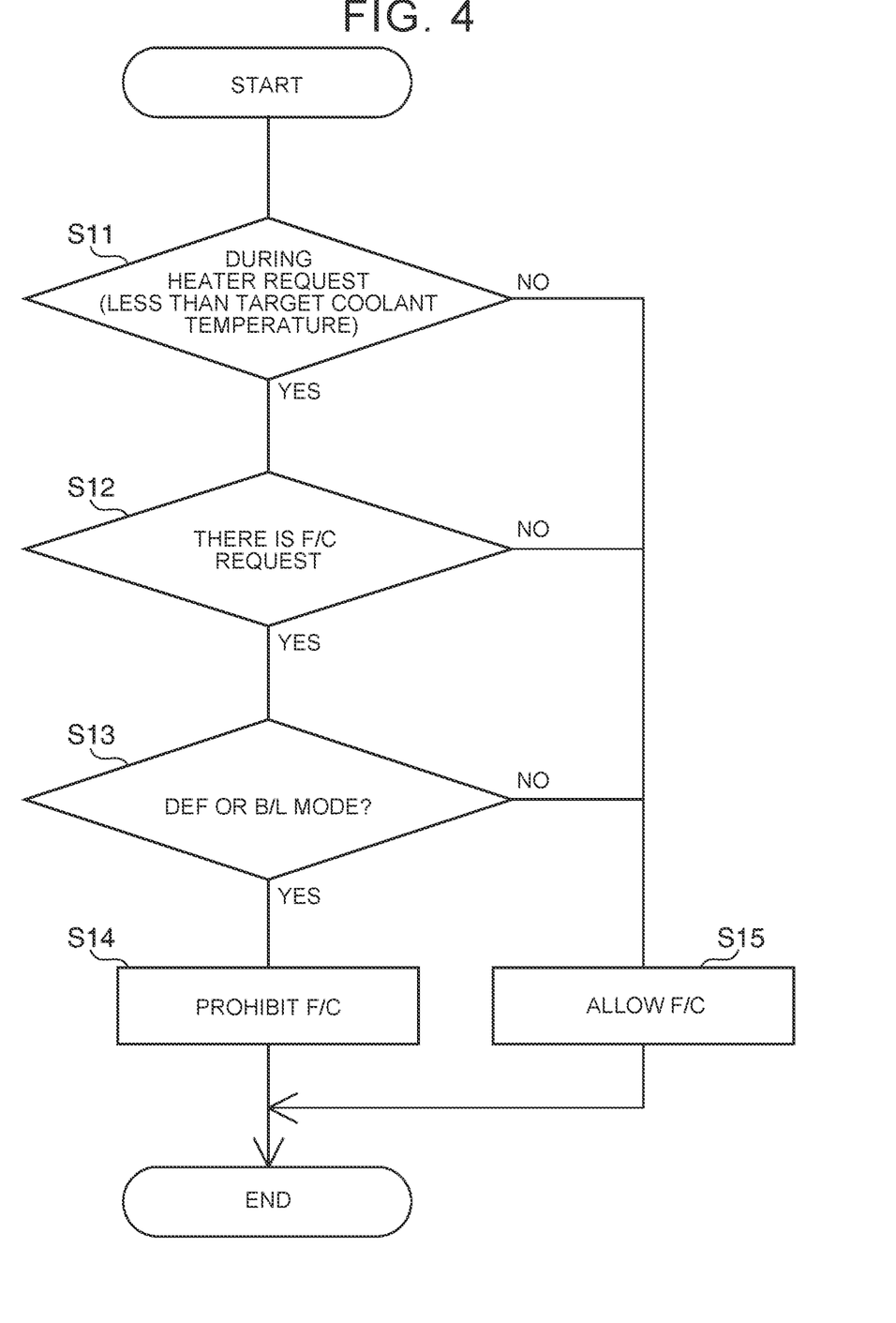
FIG. 4 is a flowchart that shows a control routine of the control device of the example of the present disclosure.

FIG. 4 is a flowchart showing a control routine of the control device 10 before the fuel cut is executed. The control routine shown in FIG. 4 is performed at predetermined intervals when the air conditioning device 40 is turned on.

First, in step S11, the air conditioning ECU 50 determines whether heating is being requested and whether the engine coolant temperature is less than the target coolant temperature. When it is determined that heating is not being requested or when heating is requested by the engine coolant temperature is not less than the target coolant temperature (is equal to or higher than the target coolant temperature) in step S11, the control routine proceeds to step S15, and proceeds to the end step without prohibiting the fuel cut (without doing anything). In contrast, when it is determined in step S11 that heating is being requested and that the engine coolant temperature is less than the target coolant temperature, the control routine proceeds to step S12.

In step S12, the engine ECU 30 determines whether the predetermined fuel cut condition is satisfied and whether there is a request to stop fuel supply to the engine 20 (fuel cut request). When it is determined that there is no fuel cut request in step S12, the control routine proceeds to step S15, and proceeds to the end step without prohibiting the fuel cut (without doing anything). In contrast, when it is determined in step S12 that there is the fuel cut request, the control routine proceeds to step S13.

In step S13, the air conditioning ECU 50 determines whether the blowout port mode of the air conditioning air is manually set to the defroster (DEF) mode or the bi-level (BI-LEVEL) mode by the passenger. When it is determined that the blowout mode is not manually set to the defroster (DEF) mode or the bi-level (BI-LEVEL) mode by the passenger in step S13, the control routine proceeds to step S15, and proceeds to the end step and allows the fuel cut (without prohibiting the fuel cut and without doing anything).

In contrast, when it is determined that the blowout port mode is manually set to the defroster (DEF) mode or the bi-level (BI-LEVEL) mode by the passenger in step S13, the control routine proceeds to step S14. Then, in step S14, a signal of prohibiting the fuel cut is output from the air conditioning ECU 50 to the engine ECU 30, and the fuel cut is prohibited. Then, the control routine proceeds to the end step.

Figure 5:
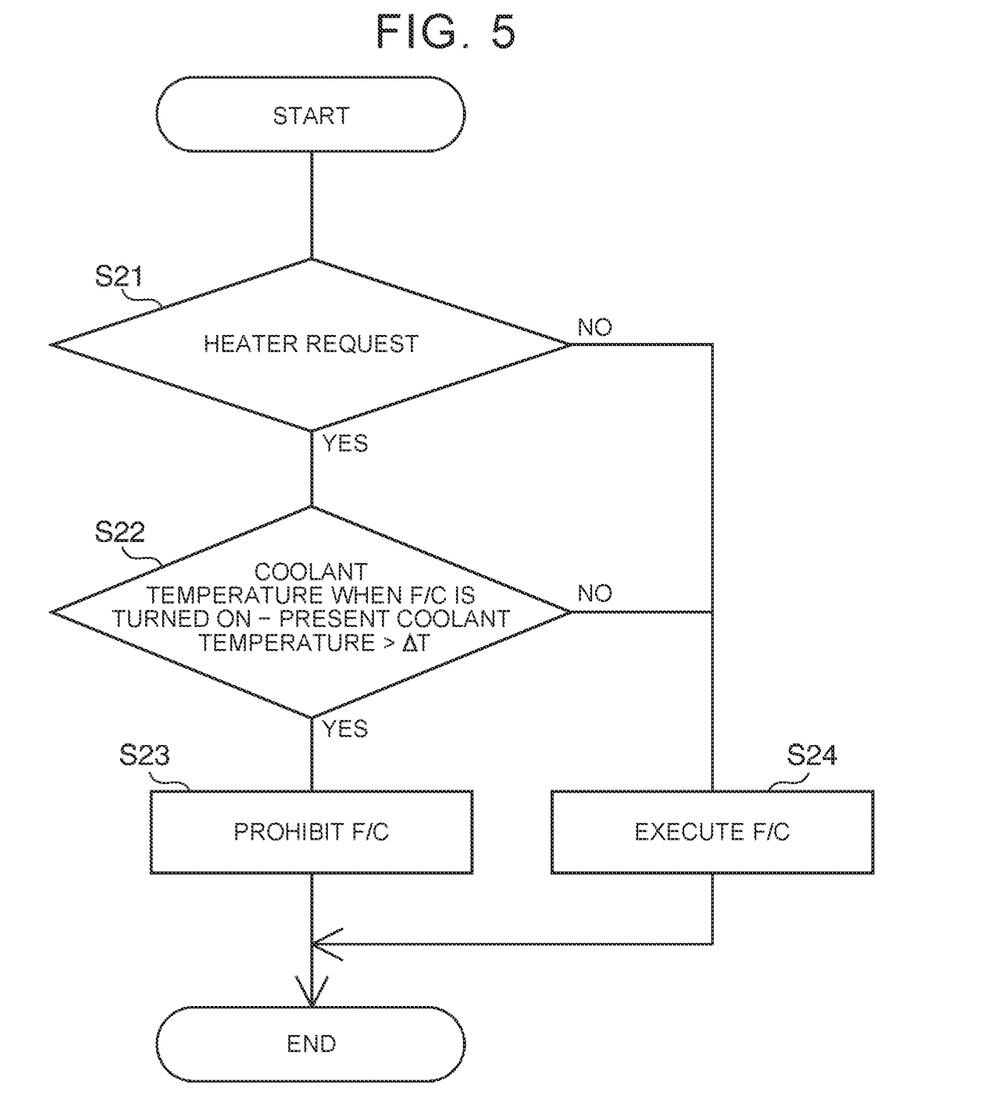
FIG. 5 is a flowchart showing the control routine after a fuel cut of the control device of the example of the present disclosure is executed.

FIG. 5 is a flowchart showing a control routine of the control device 10 after the fuel cut is executed. The control routine shown in FIG. 5 is performed at predetermined intervals when the fuel cut is being executed.

First, in step S21, the air conditioning ECU 50 determines whether heating is being requested. When it is determined that there heating is being requested in step S21, the control routine proceeds to step S24, and then proceeds to the end step without prohibiting (suspending) the fuel cut (continuing executing the fuel cut). In contrast, when it is determined in step S21 that heating is being requested, the control routine proceeds to step S22.

In step S22, the air conditioning ECU 50 determines whether a present coolant temperature has decreased from the a coolant temperature at the time when the execution of the fuel cut is started (coolant temperature when the fuel cut (F/C) is turned on) compared to a predetermined temperature ($\Delta T$), due to the execution of the fuel cut.

Figure 6:
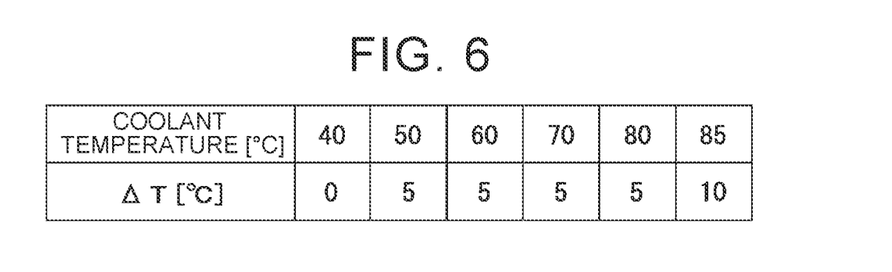
FIG. 6 is a ΔT map of FIG. 5.

The predetermined temperature ($\Delta T$) is determined by referring to a map shown in FIG. 6 in which the map is stored in the air conditioning ECU 50 in advance. The "coolant temperature" in FIG. 6 is the coolant temperature when the F/C is turned on. As shown in FIG. 6, the predetermined temperature ($\Delta T$) is set such that when the coolant temperature when the F/C is turned on is high, the predetermined temperature is a larger value as compared to the case when the coolant temperature when the F/C is turned on is low.

When it is determined in step S22 that the present coolant temperature has not become lower than the predetermined temperature ($\Delta T$), the control routine proceeds to step S24, and then proceeds to the end step without prohibiting (suspending) the fuel cut.

In contrast, when it is determined in step S22 that the present coolant temperature has become lower than the predetermined temperature ($\Delta T$), the control routine proceeds to step S23. Then, in step S23, the signal of prohibiting (suspending) the fuel cut is output from the air conditioning ECU 50 to the engine ECU 30, and the fuel cut is prohibited (suspended). Then, the control routine proceeds to the end step.

Figure 7:
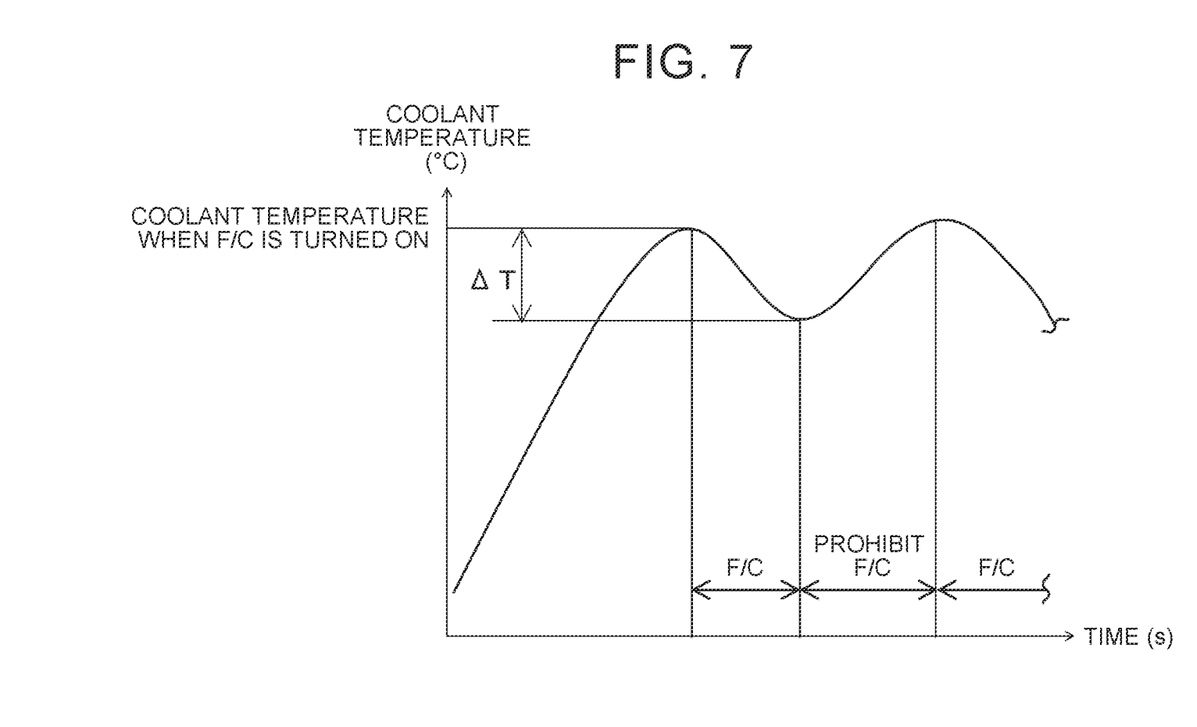
FIG. 7 is a flowchart showing the relationship between the time and an engine coolant temperature after the fuel cut of the control device of the example of the present disclosure is executed.

As shown in FIG. 7, when the fuel cut is executed, since the fuel is not supplied to the engine 20 and combustion in the engine 20 is not performed, the engine coolant temperature is decreased. However, when the fuel cut is prohibited (suspended) while the fuel cut is being executed, since the fuel is supplied to the engine 20 and combustion in the engine 20 is restarted, the engine coolant temperature is increased. Then, when the fuel cut is prohibited (suspended) and the engine coolant temperature is once again increased to the coolant temperature or higher when the F/C is turned on, the fuel cut is restarted. In this way, after the fuel cut is executed, prohibiting (suspending) and restarting of the fuel cut is repeated.

Next, operations and effects of the examples of the present disclosure will be described.

When the defroster (DEF) mode is selected as the blowout port mode of air conditioning, it is necessary to remove windshield fogging in response to a request from the passenger and ensure visibility of the passenger. In addition, when the bi-level (BI-LEVEL) mode is selected, it is necessary to ensure a state in which the passenger's head is cool and feet are warm in which the passenger feels comfortable in response to a request from the passenger. Thus, the defroster (DEF) mode and the bi-level (BI-LEVEL) mode are modes with a relatively high priority within the blowout port modes of air conditioning.

On this basis, as shown in FIG. 4, even when there is a request for the fuel cut while heating being requested, when the blowout port mode of air conditioning air is set to a defroster (DEF) mode or a bi-level (BI-LEVEL) mode, since the control device prohibits the fuel cut, it is possible to prohibit the fuel cut and prioritize heating. Thus, it is possible to suppress the engine coolant temperature from decreasing due to the executing the fuel cut and suppress the blowout temperature of the air conditioning air from decreasing, and it is possible to efficiently acquire the effect of the defroster (DEF) mode and the bi-level (BI-LEVEL) mode. Therefore, it is possible to suppress a decrease in passenger comfortability resulting from a fuel cut.

(B) When the engine coolant temperature is equal to or higher than the target coolant temperature with respect to the target blowout temperature (TAO) to the vehicle cabin, even when the fuel cut is executed and the engine coolant temperature is slightly decreased, the blowout temperature of the air conditioning air is not decreased to a degree in which the comfortability of the passenger is affected, and it is possible to efficiently acquire the effect of the defroster (DEF) mode and the bi-level (BI-LEVEL) mode. Thus, the fuel cut can be executed. In contrast, when the engine coolant temperature is less than the target coolant temperature with respect to the target blowout temperature (TAO) to the vehicle cabin, when the fuel cut is executed and the engine coolant temperature is decreased, there is a possibility that it is difficult to efficiently acquire the effect of the defroster (DEF) mode and the bi-level (BI-LEVEL) mode.

On this basis, since the fuel cut is prohibited when the engine coolant temperature is less than the target coolant temperature with respect to the target blowout temperature (TAO) to the vehicle cabin, it is possible to execute the fuel cut without prohibiting the fuel cut when the engine coolant temperature is equal to or higher than the target coolant temperature with respect to the target blowout temperature (TAO). Thus, it is possible to suppress a decrease in opportunities to perform the fuel cut while suppressing a decrease in passenger comfortability resulting from the fuel cut.

(C) In contrast, after the fuel cut is executed, as shown in FIG. 5, when heating is being requested and the engine coolant temperature has decreased to the predetermined temperature ($\Delta T$) or lower from the start of the fuel cut, the fuel cut is prohibited (suspended). Thus, it is possible to once again supply fuel to the engine 20 and restart combustion of the engine 20, and it is possible to increase the engine coolant temperature than has decreased due to the fuel cut. Therefore, even when the fuel cut is executed, it is possible to suppress the engine coolant temperature from decreasing and a heating performance from decreasing due to the fuel cut.

(D) Moreover, after the fuel cut is prohibited (suspended) after the fuel cut is executed, when the engine coolant temperature is increased to the predetermined temperature ($\Delta T$) or higher, the fuel cut is restarted. Thus, it is possible to suppress a decreased in opportunities to perform the fuel cut while maintaining the heating performance.

What is claimed is:

1. A control device of a vehicle in which the control device is installed in the vehicle that is able to execute a fuel cut that stops fuel supply to an engine in a state in which the engine is rotating,
  wherein in a case where there is a request for the fuel cut while there is a heating request in which heating of a vehicle cabin is performed using heat of an engine coolant, when a blowout port mode of air conditioning air is set to a defroster mode or a bi-level mode, the control device prohibits the fuel cut.

2. The control device of the vehicle according to claim 1, wherein when an engine coolant temperature that is a coolant temperature of the engine coolant is less than a target coolant temperature with respect to a target blowout temperature to the vehicle cabin, the fuel cut is prohibited.

* * * * *